(12) United States Patent
Elliott (10) Patent No.: US 11,415,543 B2
(45) Date of Patent: Aug. 16, 2022

(54) SENSOR ASSEMBLIES

(71) Applicant: Future Technology (Sensors) Ltd, Banbury (GB)

(72) Inventor: Howard Elliott, Banbury (GB)

(73) Assignee: Future Technology (Sensors) Ltd., Banbury (GB)

( * ) Notice: Subject to any disclaimer, the term of this patent is extended or adjusted under 35 U.S.C. 154(b) by 234 days.

(21) Appl. No.: 16/750,375

(22) Filed: Jan. 23, 2020

(65) Prior Publication Data
US 2020/0256825 A1 Aug. 13, 2020

(30) Foreign Application Priority Data

Feb. 8, 2019 (GB) ..................................... 1901753

(51) Int. Cl.
*G01D 11/24* (2006.01)
*G01N 27/407* (2006.01)
*G01N 27/406* (2006.01)

(52) U.S. Cl.
CPC ....... *G01N 27/4078* (2013.01); *G01D 11/245* (2013.01); *G01N 27/4067* (2013.01)

(58) Field of Classification Search
CPC ........... G01N 27/4078; G01N 27/4067; G01D 11/245
See application file for complete search history.

(56) References Cited

U.S. PATENT DOCUMENTS 4,119,513 A * 10/1978 Shum .................. G01N 27/4075
204/426
4,152,232 A * 5/1979 Otsuka ............... G01N 27/4076
204/424

(Continued)

FOREIGN PATENT DOCUMENTS

| EP | 0151795 A2 | 8/1985 |
| EP | 0151795 A3 | 10/1985 |
| EP | 2330408 A1 | 6/2011 |

OTHER PUBLICATIONS

Extended European Search Report for European Application No. EP 20155112.4, published by the European Patent Office (EPO), dated Jul. 3, 2020, including corresponding Communication, 1-page Annex, 5-page EPO Form 1703, and Information on Search Strategy, 9 pages total.

(Continued)

*Primary Examiner* — Jamel E Williams
(74) *Attorney, Agent, or Firm* — Kilyk & Bowersox, P.L.L.C.

(57) ABSTRACT

A sensor assembly is described. The sensor assembly includes a sensor body having an outwardly-extending flange, first and second spacers, and an integral two-part housing with first and second housing parts. The two-part housing includes an annular groove in which the outwardly-extending flange and the first and second spacers are received. Facing annular surfaces of the housing and the first and second spacers are in sliding contact with each other. Facing annular surfaces of the first and second spacers and the flange are in sliding contact with each other. The annular surfaces of the housing apply a compressive load to the flange by means of the first and second spacers to maintain a hermetic seal between the facing annular surfaces. The facing annular surfaces accommodate differential thermal expansion between the component parts of the sensor assembly if the sensor assembly is exposed to an environment with an elevated temperature.

21 Claims, 7 Drawing Sheets

(56) References Cited

U.S. PATENT DOCUMENTS

| | | | | |
|---|---|---|---|---|
| 4,210,510 A | * | 7/1980 | Grimes | G01N 27/4075 |
| | | | | 204/428 |
| 4,842,713 A | * | 6/1989 | Stahl | G01N 27/4077 |
| | | | | 204/424 |
| 2010/0263434 A1 | | 10/2010 | Aoki et al. | |
| 2012/0036929 A1 | | 2/2012 | Fujita et al. | |
| 2012/0255356 A1 | | 10/2012 | Kume et al. | |
| 2017/0030787 A1 | * | 2/2017 | Buck | G01L 9/0052 |

OTHER PUBLICATIONS

Search Report under Section 17(5) for Application No. GB1901753.2, published by the United Kingdom Intellectual Property Office, dated Aug. 9, 2019, 3-pages.

\* cited by examiner

SENSOR ASSEMBLIES

CROSS-REFERENCE TO RELATED APPLICATION

The present application claims priority to United Kingdom Patent Application No. 1901753.2 filed on Feb. 8, 2019, the disclosure of which is expressly incorporated by reference herein in its entirety.

FIELD OF THE INVENTION

Technical Field

The present invention relates to sensor assemblies, and in particular to sensor assemblies that incorporate a sensor body.

The term "sensor assemblies" is intended to cover a wide variety of different sensor types and products as illustrated by the following (non-exhaustive) list: pressure sensors, strain gauge sensors, temperature sensors, capacitive sensors, displacement measurement sensors, blade tip timing sensors, blade tip clearance measurement sensors, inductive sensors, optical sensors and microwave sensors and infrared sensors.

BACKGROUND TO THE INVENTION

EP 2330408 describes a sensor assembly that can be used in high temperature operating environments. The sensor assembly includes a sensor body having a radial flange. A housing has an annular groove in which the radial flange of the sensor body is received. The annular groove is defined by a pair of facing shoulders each having an annular surface and a substantially cylindrical surface.

The annular surfaces of the shoulders are in sliding contact with annular surfaces of the flange and apply a compressive load to the flange. The sensor body is therefore not physically secured to the housing (e.g., by brazing) but is firmly held within the housing as a result of the compressive load that is applied to the flange by the annular surfaces of the shoulders. The particular construction of the sensor assembly means that there are no significant problems with differential thermal expansion and the sensor assembly is therefore inherently suitable for use in high temperature environments.

The sensor assembly can be a capacitive sensor that is used to measure the clearance between the tip of a gas turbine engine blade and the surrounding casing.

SUMMARY OF THE INVENTION

The present invention provides a sensor assembly comprising:
a sensor body having an outwardly-extending flange with a first annular surface and a second annular surface;
a first spacer having a first annular surface and a second annular surface;
a second spacer having a first annular surface and a second annular surface; and
a housing having an annular groove in which the outwardly-extending flange and the first and second spacers are received, the annular groove being defined between a first annular surface and a second annular surface of the housing;
wherein:
the first annular surface of the housing is in sliding contact with the first annular surface of the first spacer;
the second annular surface of the first spacer is in sliding contact with the first annular surface of the outwardly-extending flange;
the second annular surface of the outwardly-extending flange is in sliding contact with the first annular surface of the second spacer; and
the second annular surface of the second spacer is in sliding contact with the second annular surface of the housing; and
wherein the first and second annular surfaces of the housing apply a compressive load to the outwardly extending flange by means of the first and second spacers.

The spacers are electrically non-conductive and can be formed from a suitable ceramic material or any other suitable electrically non-conductive material. The choice of material may depend on material(s) of the other components such as the flange of the sensor body and the housing with which the spacers are in sliding contact in order to maintain a hermetic seal and accommodate differential thermal expansion. The spacers can substantially surround the sensor body (e.g., be annular spacers) and can have an opening through which the sensor body is received.

The housing can be formed from a suitable metal or metal alloy that can withstand the elevated operating temperatures that the sensor assembly will typically experience in use.

The sensor body can have a substantially cylindrical shape with a substantially circular cross-section.

The flange can be a radial flange. The flange can include an outer edge surface between its first and second annular surfaces. The outer edge surface can be substantially cylindrical.

The annular groove can further include an inner surface of the housing between its first and second annular surfaces. The inner surface of the housing can be substantially cylindrical.

Each spacer can include an outer edge surface that faces the inner surface of the housing and an inner edge surface that defines the spacer opening and faces an outer surface of the sensor body. The outer edge surface of each spacer can be substantially cylindrical. The inner edge surface of each spacer can be substantially cylindrical. The outer and inner edge surfaces of each spacer can be in contact with, or a close tolerance fit to, the inner surface of the housing and the outer surface of the sensor body, respectively.

The sensor body is preferably electrically insulated from the housing—optionally by being spaced apart from the housing by the spacers. The sensor body can be spaced apart from the housing by an annular void or by interposing electrically non-conductive material. At least part of the void between the sensor body and the housing can be filled by a suitable electrically non-conductive material or it can be left unfilled, i.e., as an airgap which provides the necessary electrical insulation.

The sensor body can be formed from any suitable material and preferably includes an electrically conductive electrode. The sensor body can also include an electrically conductive shield. The electrode and the shield can be made of any suitable electrically conductive material such as a metal, metal alloy or ceramic. The shield is electrically insulated from the electrode.

The sensor body can be formed from any suitable material such as a metal, metal alloy, ceramic, or combination thereof. The sensor body can have a multi-layered or multi-part construction with one or more layers or parts of suitable electrically conductive material such as a metal, metal alloy or ceramic, and one or more layers or parts of suitable electrically non-conductive material such as a ceramic. The electrically conductive layers or parts of the sensor body can define the electrode or shield, or parts of the sensor body that provide an electrical connection between the electrode or shield and a transmission cable, e.g., a coaxial or triaxial cable. Such a transmission cable can be electrically connected to the sensor body in a suitable manner. In one arrangement, the connection between the sensor body and the transmission cable can be made using a hermetically sealed and substantially rigid cable connection assembly. Such a cable connection assembly can dampen any small movements or vibrations of the sensor body within the housing, thereby minimising noise. Mineral insulation cables are normally hygroscopic and cable isolation resistance can be impaired if it absorbs moisture. Using a hermetically sealed cable connection assembly means that if any small amount of moisture does enter the sensor assembly, see below, it will not have any adverse effect on the mineral insulation cable. The transmission cable can be orientated substantially perpendicular to the axis of the sensor body or at any other suitable or convenient orientation. The electrically non-conductive layers or parts of the sensor body can electrically insulate the electrode from the housing or the shield from the electrode and the housing, for example. Some of the layers can be deposited layers, e.g., applied using a suitable deposition process.

The electrode can have any suitable shape. Typically, the electrode will have a substantially circular cross-section.

An electrically conductive coating can be applied to the electrode, for example to a front or outwardly-facing surface of the electrode.

A thermal barrier coating can be applied to the electrode, for example to a front or outwardly-facing surface of the electrode, or to previously applied surface coating, to protect it against elevated temperatures to which it might be exposed in use. The electrode is typically located at a front-end part of the sensor assembly. In the case of a capacitive sensor, for example, that is used to measure the clearance between the tip of a gas turbine engine blade and the surrounding casing, the front end part of the sensor assembly would be the part that extends towards the blade tip and that would be exposed to elevated temperatures and contaminants in use. Exposure to elevated temperatures will cause the temperature of the sensor assembly itself to increase—see below for a more detailed discussion of how the construction of the sensor assembly allows it to accommodate differential thermal expansion between the various components of the sensor assembly as a result of significant temperature changes, e.g., between ambient temperature when the gas turbine engine is non-operational and an elevated temperature such as 1200° C. or more when the gas turbine engine is operational.

The sensor body can be formed with an axially-extending support and an electrode. If the electrode is formed as a separate component, it can be secured to the support by any suitable means such as by welding or brazing, or by using complementary screw-threads or a mechanical fixing, for example. The flange can be part of the support and the electrode can be secured to a front end part of the support after one of the spacers has been located over the front end part of the support, i.e., so that the located spacer is axially positioned on the support between the flange and the electrode.

As mentioned above, the support can provide an electrical connection between the electrode and a transmission cable, e.g., a coaxial or triaxial cable. If the sensor body includes a shield, the support can also provide an electrical connection between the shield and the transmission cable. The transmission cable can be electrically connected to the support at a rear end part which might experience a lower temperature than the front-end part in use.

The housing can be a two-part housing. In particular, the first annular surface of the housing can be formed in a first housing part and the second annular surface of the housing can be formed in a second housing part. The first housing part is preferably fixedly secured to the second housing part, e.g., by braze material, by welding or any other suitable fixing process. One of the first and second housing parts can be an outer housing and the other one of the first and second housing parts can be an inner housing that is at least partly located, and optionally completely located, within the outer housing.

The front-end part of the housing can include a recessed opening in which the electrode is located. The front-end part of the housing can be spaced apart from the electrode by an annular void or by interposing electrically non-conductive material. At least part of the annular void between the electrode and the front end part of the housing can be filled by a suitable electrically non-conductive material, including the thermal barrier coating mentioned above which can also be applied to the front or outwardly-extending surface of the electrode to protect it against elevated temperatures. Alternatively, the annular void between the electrode and the front-end part of the housing can be left unfilled, i.e., as an airgap which provides the necessary electrical insulation. Filling the annular void can be useful because it seals the recessed opening at the front end of the sensor assembly and can therefore prevent the ingress of contaminant materials that might affect operation of the sensor assembly. The front-end part of the housing can project beyond the front or outwardly-facing surface of the electrode to define an annular collar that can be filled with the thermal barrier coating material or other electrically non-conducting material, for example.

The sensor body is not physically secured to the housing but is firmly held within the housing as a result of the compressive load that is applied to the flange by the housing—i.e., by means of the spacers. The particular construction of the sensor assembly means that there are no significant problems with differential thermal expansion between the various components of the sensor assembly even though they are typically made of different types of material, e.g., metal, metal alloy, ceramic etc. The sensor assembly is therefore inherently suitable for use in environments with elevated operating temperatures. If the housing is made of a suitable metal or metal alloy, the sensor body is made predominantly from a suitable metal or metal alloy, and the spacers are made of a suitable ceramic, when the sensor body experiences a significant change in temperature, the differential thermal expansion between the housing and the spacers can be accommodated by the sliding contact between the facing annular surfaces, and the differential thermal expansion between the spacers and the sensor body can be accommodated by the sliding contact between the facing annular surfaces. If the housing is made from a suitable metal or metal alloy, the sensor body is made predominantly from a suitable ceramic, and the spacers are made of a suitable ceramic, when the sensor body experiences a significant change in temperature, the differential thermal expansion between the housing and the spacers can be accommodated by the sliding contact between the facing annular surfaces. (It will be understood that there will be very little differential thermal expansion between the sensor body and the spacers if they are both made of a suitable ceramic, and that this can be minimized or even eliminated completely by using the same ceramic or by using different ceramics that have substantially similar thermal expansion coefficients.) The components of the sensor assembly will primarily move relative to each other in the radial direction as a result of significant temperature changes and such radial movement is accommodated by the sliding contact between the various facing annular surfaces as described above. Any relative movement in the axial direction is very small (typically in the order of a few microns) and is accommodated by the material properties of the housing.

A suitable coating can be applied to any of the annular surfaces to reduce friction and wear between the sliding contact surfaces.

The compressive load applied to the flange by the housing is applied through four sets of facing annular surfaces that are also in sliding contact, i.e. (i) the facing annular surfaces of the first housing part and the first spacer, (ii) the facing annular surfaces of the first spacer and the flange, (iii) the facing annular surfaces of the second spacer and the flange, and (iv) the facing annular surfaces of the second housing part and the second spacer. This can provide a significant improvement as compared to the sensor assembly described in EP 2330408 where the compressive load is applied through only two sets of facing annular surfaces, i.e., the facing annular surfaces of the first housing part and the flange and the facing annular surfaces of the second housing part and the flange. The improvement can be reduced wear in the annular surfaces, and an increase lifetime for the sensor assembly. The spacers can also maintain the position/alignment of the sensor body within the housing and provide electrical insulation.

The sensor assembly can be manufactured in a cost-effective manner using conventional brazing techniques as described in more detail below.

The present invention further provides a method of manufacturing a sensor assembly comprising the steps of:

providing a sensor body having an outwardly-extending flange with a first annular surface and a second annular surface;

providing a first spacer having a first annular surface and a second annular surface;

providing a second spacer having a first annular surface and a second annular surface;

locating the sensor body and the first and second spacers in a two-part housing having an annular groove in which the outwardly-extending flange and the first and second spacers are received, the annular groove being defined between a first annular surface formed in a first housing part and a second annular surface formed in a second housing part;

bringing the first annular surface of the first housing part into contact with the first annular surface of the first spacer;

bringing the second annular surface of the first spacer into contact with the first annular surface of the outwardly-extending flange;

bringing the second annular surface of the outwardly-extending flange into contact with the first annular surface of the second spacer;

bringing the second annular surface of the second spacer into contact with the second annular surface of the second housing part; and securing the first and second housing parts to form an integral two-part housing such that a compressive load is applied to the outwardly-extending flange by means of the first and second spacers.

In one method, the step of securing the first and second housing parts together may further comprise the steps of:

increasing the temperature of the sensor assembly to a particular temperature during which the first and second housing parts undergo thermal expansion;

securing the first and second housing parts together with the sensor assembly at the particular temperature; and decreasing the temperature of the sensor assembly during which the first and second housing parts of the integral two-part housing undergo thermal contraction to apply a compressive load to the outwardly-extending flange by means of the first and second spacers.

The step of securing the first and second housing parts together can use a brazing process and can further comprise the step of applying a braze material between the first and second housing parts in a molten state. Reducing the temperature of the sensor assembly from the particular temperature (e.g., a brazing temperature) means that the braze material solidifies to secure the first and second housing parts together to form the integral two-part housing.

Any suitable braze material can be used.

In a preferred brazing method, the first and second housing parts are assembled together to substantially surround the sensor body with respective brazing surfaces in contact or in close proximity. During the brazing process, as the sensor assembly is raised to the brazing temperature, the first and second housing parts are preferably loaded to maintain direct contact between the various facing annular surfaces. More particularly, a load is preferably applied to the first and second housing parts to force them towards each other in the axial direction. This brings the annular surfaces of the first and second housing parts into contact with the facing annular surfaces of the spacers, and brings the opposite annular surfaces of the spacers, in turn, into contact with the facing annular surfaces of the flange. At the particular brazing temperature, the braze material is in the molten state and the contact between the various facing annular surfaces is preferably maintained under load. The brazing material is applied between the brazing surfaces of the first and second housing parts. The braze material can be applied when the sensor assembly is at an ambient temperature (i.e., in "cold" application process) so that it transitions to the molten state when the temperature of the sensor assembly reaches the particular brazing temperature, or the braze material can be applied once the temperature of the sensor assembly has reached the brazing temperature (i.e., in a "hot" application process). As the temperature of the sensor assembly is subsequently reduced, the braze material solidifies to fixedly secure the first and second housing parts together to form an integral two-part housing surrounding the sensor body. As the temperature of the sensor assembly is reduced, the first and second housing parts undergo thermal contraction and effectively shrink onto the flange of the sensor body to apply a significant compressive load onto the flange in the axial direction through the spacers. In other words, the first and second housing parts contract more than the sensor body as the temperature decreases. The application of the compressive load results in the creation of a hermetic seal between the housing and the sensor body. In particular, the hermetic seal is created between the various facing annular surfaces that are held in sliding contact by the application of the compressive load. In practice, it should be understood that, while the hermetic seal will generally prevent the ingress of moisture and other contaminants into the rear part of the sensor assembly, a very small amount of air will sometimes be allowed past the sliding seals as a result of the asperities in the sliding surfaces, wearing etc. It will be readily appreciated that the compressive load that arises from the shrinkage of the first and second housing parts is different to the external loading that is applied during the brazing process. The compressive load is maintained throughout the operating lifetime of the sensor assembly. Ceramic materials are known to cope well with compressive loads which makes such materials inherently suitable for the spacers and also for at least the part of the sensor body that defines the flange. In practice, the compressive load applied when the sensor assembly experiences an elevated operating temperature will be slightly less than the compressive load that is applied at ambient temperature because of the differential thermal expansion between the housing and the sensor body in the axial direction. However, the compressive load will always be at a sufficient level to maintain the hermetic seal between the various facing annular surfaces.

In another method, the step of securing the first and second housing parts together may further comprise the steps of:

mechanically compressing the first and second housing parts together to apply a compressive load to the outwardly extending flange by means of the first and second spacers; and securing the first and second housing parts together by welding while the compressive load is applied.

This can be carried out a room temperature and avoids the need for a high-temperature brazing process.

BRIEF DESCRIPTION OF THE DRAWINGS

The present invention can be even more fully understood with the reference to the accompanying drawings which are intended to illustrate, not limit, the present invention.

DETAILED DESCRIPTION OF THE INVENTION

Referring to FIGS. 1 to 5, a first sensor assembly 2 includes a sensor body 4 with an electrode 6 secured to an axially-extending support 8.

Figure 1:
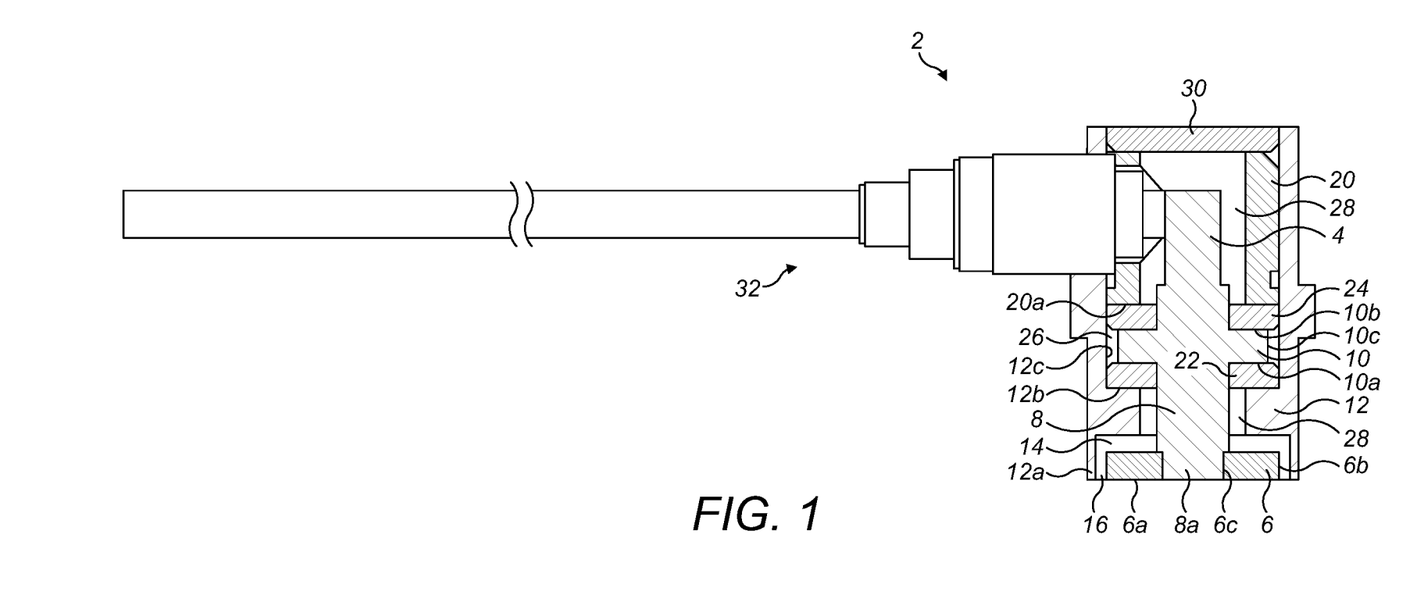
FIG. 1 is a cross section view of a first sensor assembly according to the present invention.
Figure 2:
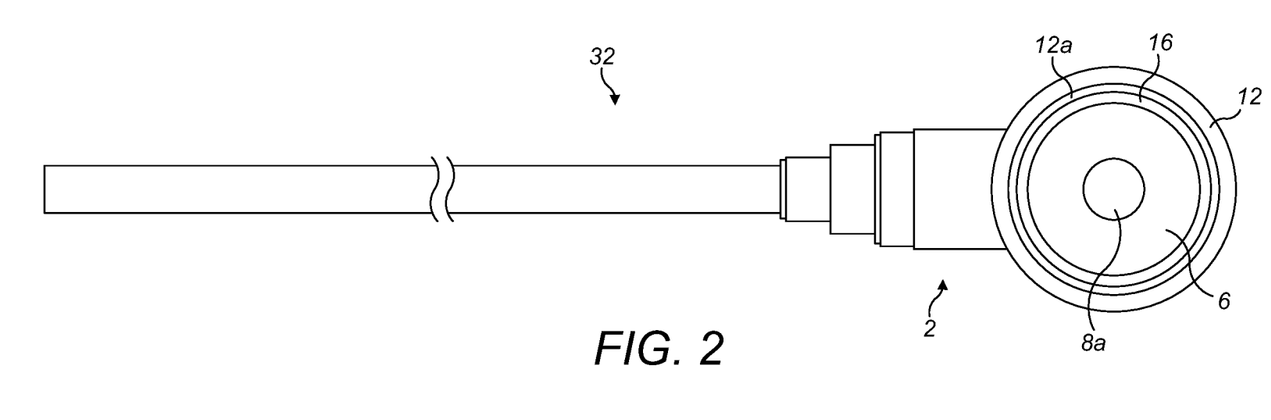
FIG. 2 is an axial end view of the first sensor assembly of FIG. 1.

The electrode 6 has a front surface 6a that is substantially circular and an outer cylindrical surface 6b. An inner cylindrical surface 6c of the electrode 6 defines an opening that receives a front-end part 8a of the support 8. The electrode 6 can be secured to the front-end part 8a of the support 8 in any suitable way, e.g., by welding or brazing. Although not shown, the inner cylindrical surface 6c of the electrode can include a screw-threaded portion that allows it to be secured to screw-threaded portion of the front-end part 8a of the support 8.

The electrode 6 and the support 8 are both formed from an electrically conductive metal or metal alloy.

The support 8 is substantially cylindrical and includes a radial flange 10 that extends outwardly from the outer surface of the support. The flange 10 includes a first annular surface 10a, a second annular surface 10b, and an outer cylindrical surface 10c.

The sensor assembly 2 includes an integral two-part housing. A first housing part 12 is formed as an outer housing and includes a recess 14 at its front-end part 12a in which the electrode 6 is located. The outer cylindrical surface 6b of the electrode 6 is spaced apart from the inner surface of the front-end part 12a of the first housing part 12 by an annular void or airgap 16 that provides electrical insulation.

Figure 4:
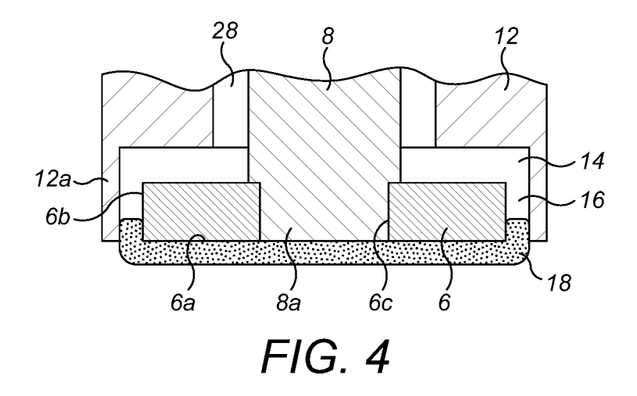
FIG. 4 is a detail view of the front-end part of the first sensor assembly of FIG. 1 with a thermal barrier coating.
Figure 5:
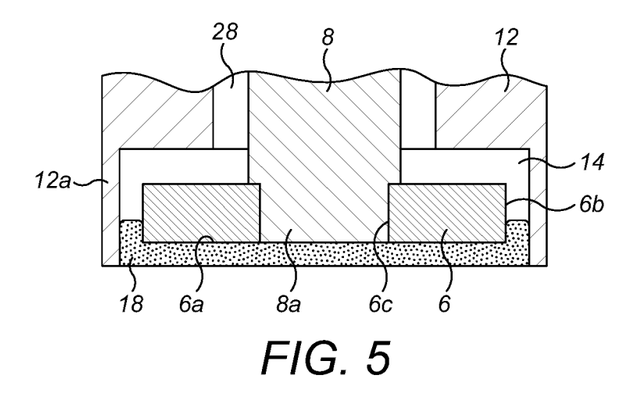
FIG. 5 is a detail view of the front-end part of an alternative version of the first sensor assembly of FIG. 1 with a thermal barrier coating.

A thermal barrier coating 18 can be applied to the front surface 6a of the electrode 6 as shown in FIG. 4. The thermal barrier coating 18 protects the electrode 6 when the sensor assembly 2 is exposed to an environment with an elevated temperature. The thermal barrier coating 18 can extend into and fill the annular void between the electrode 6 and the front-end part 12a of the first housing part 12 to prevent ingress of contaminants into the sensor assembly 2. The annular void between the electrode and the first housing part can also be filled by any other suitable electrically non-conductive material. In the sensor assembly 2 shown in FIGS. 1 and 4, the front-end part 12a of the first housing part 12 is substantially flush with the front surface 6a of the electrode 6. But in the alternative construction shown in FIG. 5, the front-end part 12a of the first housing part projects axially beyond the front surface 6a of the electrode 6 to define an annular collar to contain the thermal barrier coating 18.

The first housing part 12 includes an annular surface 12b and an inner cylindrical surface 12c.

Figure 3:
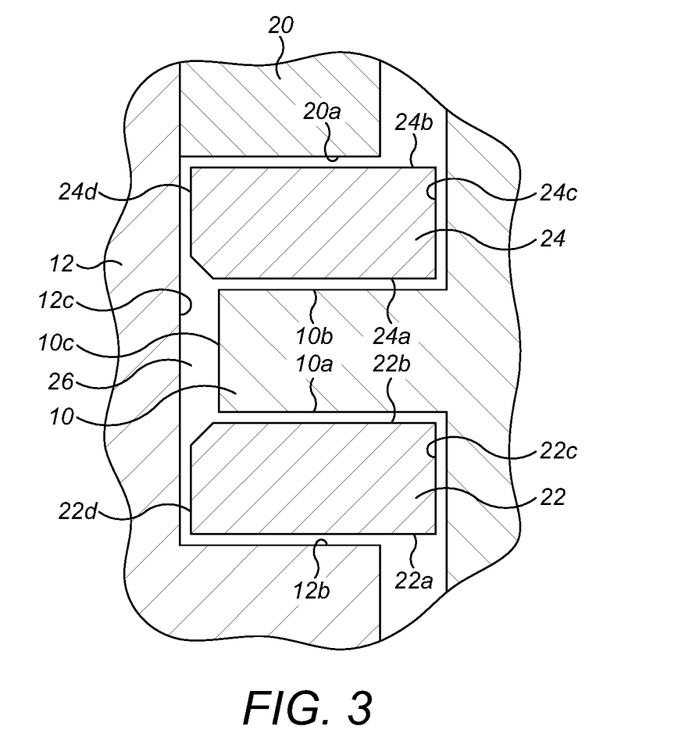
FIG. 3 is an exploded schematic view of part of the first sensor assembly of FIG. 1 showing the annular groove of the housing, the spacers and the flange.

A second housing part 20 is formed as an inner retaining ring that is coaxially located within the first housing part 12. The first and second housing parts 12, 20 are fixedly secured together as described in more detail below. The second housing part 20 includes an annular surface 20a that faces the annular surface 12b of the first housing part 12 as shown in FIGS. 1 and 3. An annular groove 26 of the housing is defined by the annular surface 20a of the second housing part 20, and by the annular surface 12b and the inner cylindrical surface 12c of the first housing part 12.

The first and second housing parts 12, 20 are formed from a metal or metal alloy.

A first annular spacer 22 includes a first annular surface 22a, a second annular surface 22b, an inner cylindrical surface 22c that defines an opening, and an outer cylindrical surface 22d. A second annular spacer 24 includes a first annular surface 24a, a second annular surface 24b, an inner cylindrical surface 24c that defines an opening, and an outer cylindrical surface 24d. The annular groove 26 defined by the first and second housing parts 12, 20, the first and second annular spacers 22, 24, and the flange 10 are shown schematically in FIG. 3 slightly spaced apart in the axial and radial directions so that the various surfaces can be clearly identified. It will be understood that in the actual sensor assembly, the facing annular surfaces will be in sliding contact with each other and are under compressive load to maintain a hermetic seal as described in more detail below.

The first and second annular spacers 22, 24 are formed from an electrically non-conductive ceramic.

The first annular spacer 22 is located as shown in FIG. 1 with part of the support 8 adjacent the flange 10 being received though the spacer opening. The first annular spacer 22 can be received over the front-end part 8a of the support 8 before the electrode 6 is fixedly secured to it, for example. The first annular surface 22a is in sliding contact with the annular surface 12b of the first housing part 12 and the second annular surface 22b is in sliding contact with the first annular surface 10a of the flange 10. The second annular spacer 24 is located on the support 8 as shown in FIG. 1 with part of the support adjacent the flange 10 being received through the spacer opening. The first annular surface 24a is in sliding contact with the second annular surface 10b of the flange 10 and the second annular surface 24b is in sliding contact with the annular surface 20a of the second housing part 20.

The inner cylindrical surface 22c that defines the opening of the first annular spacer 22 is a close tolerance fit with the outer cylindrical surface of the support 8, and the outer cylindrical surface 22d is a close tolerance fit with the inner cylindrical surface 12c of the first housing part 12. Similarly, the inner cylindrical surface 24c that defines the opening of the second annular spacer 24 is a close tolerance fit with the outer cylindrical surface of the support 8, and the outer cylindrical surface 24d is a close tolerance fit with the inner cylindrical surface 12c of the first housing part 12. The first and second annular spacers 22, 24 are sized such that the support 8 is spaced apart from the two-part housing by an annular void or airgap 28 that provides electrical insulation.

The rear end part of the first housing part 12 is closed by an end cap 30.

A transmission cable 32 is electrically connected to the support 8. The transmission cable 32 is connected to a rear end part of the support 8 which might be exposed to slightly lower temperatures that the front-end part in use. The connection between the transmission cable 32 and the support 8 is made using a hermetically sealed and substantially rigid cable connection assembly which can dampen vibration of the support. The support 8 provides an electrical connection between a conductor of the transmission cable 32 (e.g., an inner conductor of a coaxial or triaxial cable) and the electrode 6. In other embodiments, the support can be constructed to also provide a separate electrical connection between a conductor of the transmission cable (e.g., an intermediate conductor of a triaxial cable) and a shield that substantially surrounds the electrode. Measurements taken using the electrode can be supplied to external measurement equipment through the transmission cable 32.

In the assembled sensor assembly 2, the sensor body 4 is not physically secured to the two-part housing but is firmly held within the housing as a result of a compressive load that is applied to the flange 10 by the housing—i.e., by the facing annular surfaces 12b, 20b and the first and second annular spacers 22, 24. The compressive load maintains a hermetic seal between the various annular surfaces that are in sliding contact (e.g., sliding/sealing interfaces) to prevent the ingress of contaminants into the rear end part of the sensor assembly. Differential thermal expansion between the support 8 and the two-part housing in the radial direction is accommodated by the sliding contact between the various annular surfaces.

The first and second housing parts 12, 20 include brazing surfaces. When assembled together, the brazing surface of the second housing part 20 is located within the brazing surface of the first housing part 12 with a close tolerance fit.

The assembly steps of the sensor assembly will now be explained.

The first housing part 12 is supported in a suitable frame or support. The sensor body 4, i.e., the electrode 6 and the support 8, and the first and second annular spacers 22, 24 are inserted into the bore of the first housing part 12 such that the first annular surface 22a of the first annular spacer 22 is in contact with the annular surface 12b of the first housing part. The second annular surface 22b of the first annular spacer 22 is in contact with the first annular surface 10a of the flange 10 and the first annular surface 24a of the second annular spacer 24 is in contact with the second annular surface 10b of the flange. In one practical arrangement, the first spacer 22, the support 8 and the second spacer 24 can be inserted from the rear end of the first housing part 12, such that the second spacer it rests on the annular surface 12b of the first housing part, which is defined by an inwardly-extending flange between the annular groove 26 and the recess 14. The electrode 6 can then be inserted into the recess 14 and secured to the front-end part 8a of the support 8.

The first and second housing parts 12, 20 are then secured together by a brazing process. A brazing material (optionally in the form of a paste) is applied to the interface between the respective brazing surfaces of the first and second housing parts 12, 20. The brazing material may sit in a narrow annular groove formed in one or both of the facing brazing surfaces, for example. The sensor assembly 2 is raised to a particular brazing temperature that is determined by the brazing material that is to be used. During the brazing process, an axial loading is applied to the second housing part 20 to maintain a direct contact between the various annular surfaces of the first and second housing parts, the first and second annular spacers 22, 24, and the flange 10 of the support 8.

Once the temperature of the sensor assembly reaches the brazing temperature, the braze material is in the molten state and is drawn down into the interface between the brazing surfaces of the first and second housing parts 12, 20 by a capillary action.

As the temperature of the sensor assembly is subsequently reduced, the braze material solidifies to secure the first and second housing parts 12, 20 together to form an integral two-part housing surrounding the sensor body 4. More particularly, the first and second housing parts 12, 20 are fixedly secured together by the brazing material at the join or interface between the facing brazing surfaces, typically at a rear end part of the sensor assembly. The first and second housing parts 12, 20 are not secured together at any other interface and are not physically secured in any way to the sensor body 4 apart from the combination of the sliding contact between the various facing annular surfaces and compressive load. This means that the sensor assembly 2 does not experience any stresses as a result of differential thermal expansion which might in other circumstances lead to the disintegration or failure of the ceramic and/or metal components.

As the temperature of the sensor assembly is subsequently reduced, the first and second housing parts 12, 20 undergo thermal contraction and effectively shrink onto the first and second annular spacers 22, 24 which in turn apply a significant compressive load onto the flange 10 of the support 8 in the axial direction. The application of the compressive load during the brazing process results in the creation of a hermetic seal between the housing and the support. More particularly, the hermetic seal is formed between the facing annular surfaces of the first and second housing parts 12, 20 and the first and second annular spacers 22, 24, and between the facing surfaces of the first and second annular spacers and the flange 10. One or more of the annular surfaces may be machined, coated or otherwise treated to provide a smooth surface finish so that close physical contact is established across as large an area as possible. An anti-wear coating or the like may also be applied.

The transmission cable 32 can be connected to the support by means of a hermetically sealed cable connection assembly and the rear end part of the first housing part 12 can be covered by an end cap 30. In another arrangement, the electrode 6 can be secured to the front-end part 8a of the support after the brazing process is complete.

When the sensor assembly 2 is exposed to an environment with an elevated temperature, the first and second housing parts 12, 20 undergo thermal expansion and expand away from the support 8 in the radial direction. This expansion causes the annular surfaces 12b, 20a of the first and second housing parts 12, 20 to slide relative to the facing annular surfaces 22a, 24b of the first and second annular spacers 22, 24 in the radial direction. The annular surfaces 22b, 24a of the first and second annular spacers 22, 24 may also slide relative to the facing first and second annular surfaces 10a, 10b of the flange 10 in the radial direction. The flange 10 and the first and second annular spacers 22, 24 remain under a compressive load at the high operating temperature and the hermetic seal is always maintained during the operational lifetime of the sensor assembly.

Figure 6:
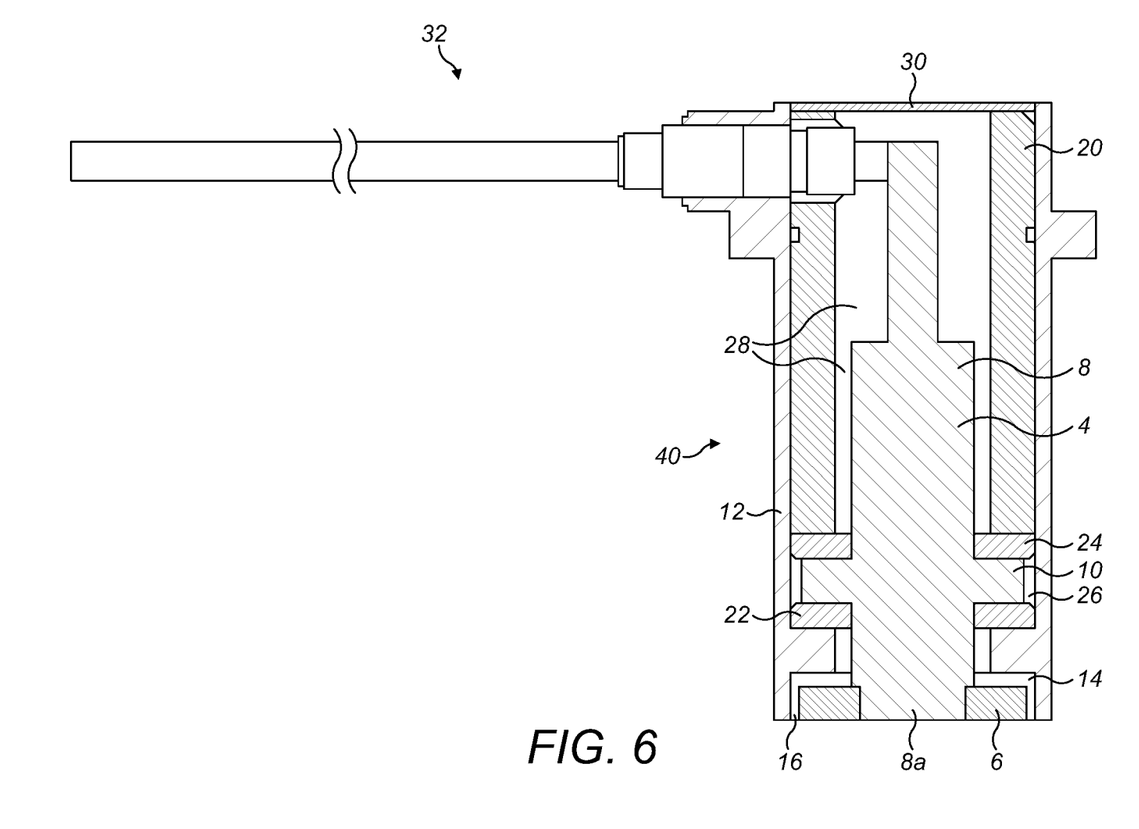
FIG. 6 is a cross section view of a second sensor assembly according to the present invention.

Referring to FIG. 6, a second sensor assembly 40 is shown that is very similar to the first sensor assembly 2 and like parts have been given the same reference sign. The second sensor assembly 40 has an extended axial construction, i.e., where the housing is longer in the axial dimension such that the transmission cable 32 is further away from the front-end part of the sensor assembly.

Figure 7:
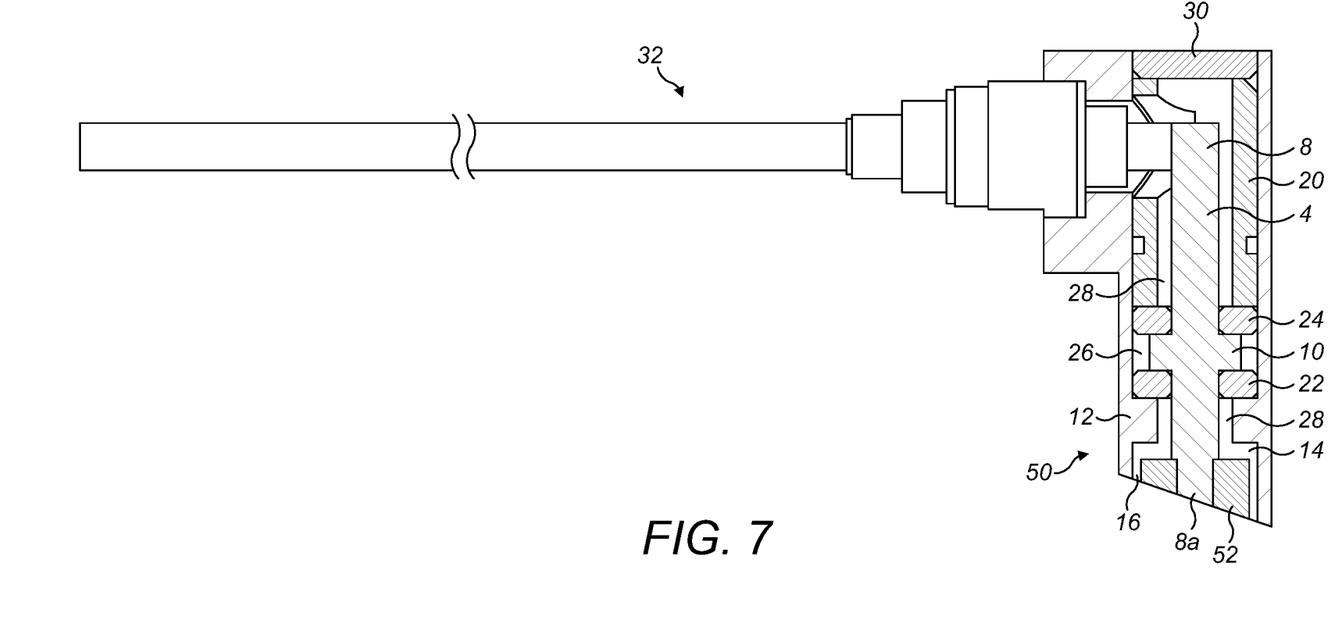
FIG. 7 is a cross section view of a third sensor assembly according to the present invention.

Referring to FIG. 7, a third sensor assembly 50 is shown that is very similar to the first and second sensor assemblies 2, 40 and like parts have been given the same reference sign. The electrode 52 is angled such that a normal to the front surface of the electrode is not parallel with a longitudinal axis of the senor assembly.

Figure 8:
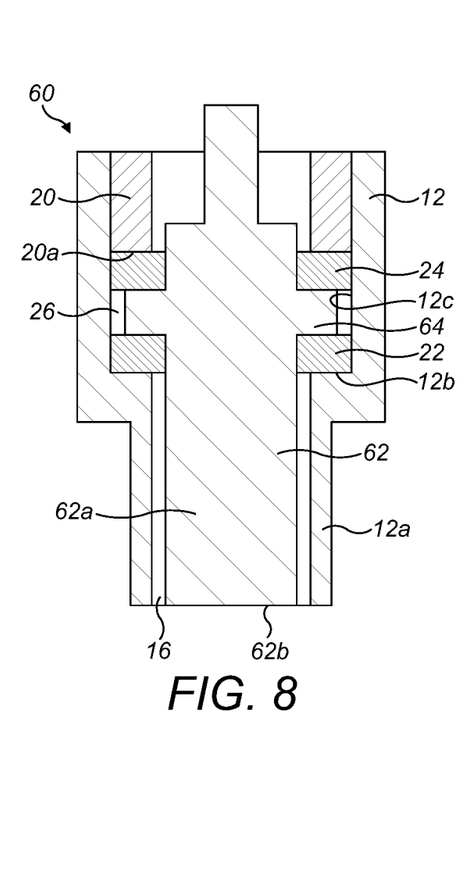
FIG. 8 is a cross section view of a fourth sensor assembly according to the present invention.
Figure 9:
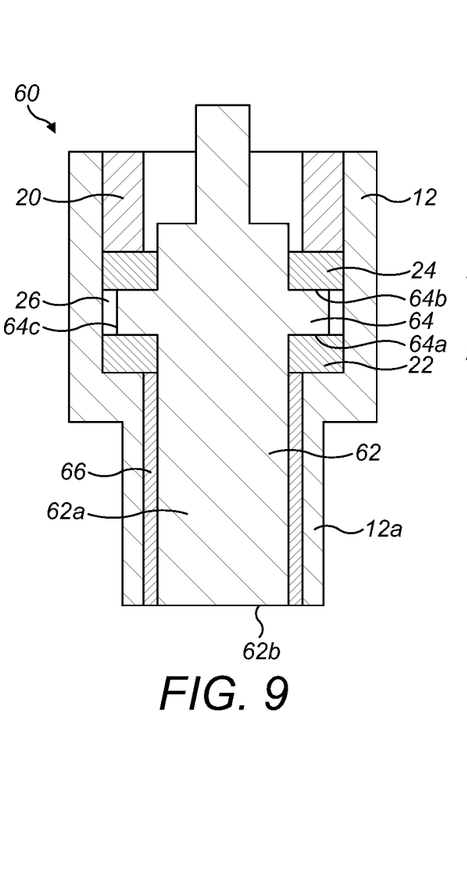
FIG. 9 is a cross section view of an alternative version of the fourth sensor assembly of FIG. 8 where the void between the sensor body and the housing is filled with an electrically non-conductive material.
Figure 10:
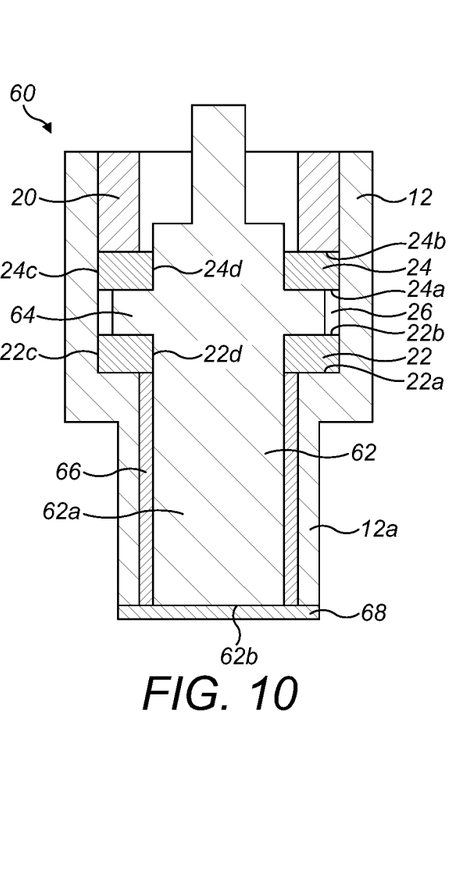
FIG. 10 is a cross section view of an alternative version of the fourth sensor assembly of FIG. 8 with a thermal barrier coating.

FIGS. 8 to 10 show a fourth sensor assembly 60. The fourth sensor assembly 60 is similar to the first, second and third sensor assemblies, 2, 40 and 50 and like parts have been given the same reference sign.

The fourth sensor assembly 60 includes a sensor body 62 with an integral electrode (not shown). In one arrangement, the sensor body 62 can have a multi-layered construction with one or more layers or parts of suitable electrically conductive material such as a metal, metal alloy or ceramic, and one or more layers or parts of suitable electrically non-conductive material such as a ceramic. The electrically conductive layers or parts of the sensor body can define the electrode or shield, or parts of the sensor body that provide an electrical connection between the electrode or shield and a transmission cable, e.g., a coaxial or triaxial cable. The electrically non-conductive layers or parts can define insulators or spacers between the electrically conductive layers or parts.

The sensor body 62 is substantially cylindrical and includes a radial flange 64 that extends outwardly from the outer surface of the sensor body. The flange 64 corresponds to the flange 10 described above and includes a first annular surface 64a, a second annular surface 64b, and an outer cylindrical surface 64c. Typically, the part of the sensor body 62 that defines the flange 64 is formed of a suitable electrically non-conductive material such as a ceramic.

The sensor assembly 60 includes an integral two-part housing. A first housing part 12 is formed as an outer housing and includes an opening at its front-end part 12a. The outer cylindrical surface of the front-end part 62a of the sensor body 62 is spaced apart from the inner surface of the front-end part 12a of the first housing part 12 by an annular void or airgap 16 (FIG. 8) that provides electrical insulation.

The annular void can be filled with a suitable non-electrically conductive material 66 as shown in FIG. 9 to prevent ingress of contaminants into the sensor assembly 60. A thermal barrier coating 68 can be applied to the front surface 62b of the sensor body 62 as shown in FIG. 10. The thermal barrier coating 68 protects the sensor body 62 when the sensor assembly 60 is exposed to an environment with an elevated temperature. The thermal barrier coating 68 can extend into and fill the annular void between the sensor body 62 and the front-end part 12a of the first housing part (i.e., the non-electrically conductive material 66 shown in FIG. 9 can be thermal barrier material). In the sensor assembly 60 shown in FIGS. 8 to 10, the front-end part 12a of the first housing part 12 is substantially flush with the front surface 62b of the sensor body 62. But in an alternative construction, the front-end part of the first housing part projects axially beyond the front surface of the sensor body to define an annular collar to contain the thermal barrier coating.

The first housing part 12 includes an annular surface 12b and an inner cylindrical surface 12c.

A second housing part 20 is formed as an inner retaining ring that is coaxially located within the first housing part 12. The first and second housing parts 12, 20 are fixedly secured together as described in more detail above. The second housing part 20 includes an annular surface 20a that faces the annular surface 12b of the first housing part 12 as shown in FIGS. 9 to 10. An annular groove 26 of the housing is defined by the annular surface 20a of the second housing part 20, and by the annular surface 12b and the inner cylindrical surface 12c of the first housing part 12.

The first and second housing parts 12, 20 are formed from a metal or metal alloy.

A first annular spacer 22 includes a first annular surface 22a, a second annular surface 22b, an inner cylindrical surface 22c that defines an opening, and an outer cylindrical surface 22d. A second annular spacer 24 includes a first annular surface 24a, a second annular surface 24b, an inner cylindrical surface 24c that defines an opening, and an outer cylindrical surface 24d.

The first and second annular spacers 22, 24 are formed from an electrically non-conductive ceramic.

The first annular spacer 22 is located as shown in FIGS. 8 to 10 with part of the sensor body 62 adjacent the flange 64 being received though the spacer opening. The first annular spacer 22 can be received over the front-end part 62a of the sensor body 62 before the sensor body is inserted into the first housing part 12. The first annular surface 22a is in sliding contact with the annular surface 12b of the first housing part 12 and the second annular surface 22b is in sliding contact with the first annular surface 64a of the flange 64. The second annular spacer 24 is located on the sensor body 62 as shown in FIGS. 8 to 10 with part of the sensor body adjacent the flange 64 being received through the spacer opening. The first annular surface 24a is in sliding contact with the second annular surface 64b of the flange 64 and the second annular surface 24b is in sliding contact with the annular surface 20a of the second housing part 20.

The inner cylindrical surface 22c that defines the opening of the first annular spacer 22 is a close tolerance fit with the outer cylindrical surface of the sensor body 62, and the outer cylindrical surface 22d is a close tolerance fit with the inner cylindrical surface 12c of the first housing part 12. Similarly, the inner cylindrical surface 24c that defines the opening of the second annular spacer 24 is a close tolerance fit with the outer cylindrical surface of the sensor body 62, and the outer cylindrical surface 24d is a close tolerance fit with the inner cylindrical surface 12c of the first housing part 12. The first and second annular spacers 22, 24 are sized such that the sensor body 62 is spaced apart from the two-part housing.

In the assembled sensor assembly 60, the sensor body 62 is not physically secured to the two-part housing but is firmly held within the housing as a result of a compressive load that is applied to the flange 64 by the housing—i.e., by the facing annular surfaces 12b, 20b—and the first and second annular spacers 22, 24. The compressive load maintains a hermetic seal between the various annular surfaces that are in sliding contact (e.g., sliding/sealing interfaces) to prevent the ingress of contaminants into the rear end part of the sensor assembly. Differential thermal expansion between the sensor body 62 and the two-part housing in the radial direction is accommodated by the sliding contact between the various annular surfaces.

Several variants of the illustrated embodiments have been described above. In the absence of any contrary statement, each variant can be adopted independently of the others and they can be used in any combination.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A sensor assembly comprising:
   a sensor body having an outwardly-extending flange with a first annular surface and a second annular surface;
   a first electrically non-conductive annular spacer that substantially surrounds the sensor body and has a first annular surface, a second annular surface, and an opening through which the sensor body is received;
   a second electrically non-conductive annular spacer that substantially surrounds the sensor body and has a first annular surface, a second annular surface, and an opening through which the sensor body is received; and
   a housing having an annular groove in which the outwardly-extending flange and the first and second electrically non-conductive annular spacers are received, the annular groove being defined between a first annular surface and a second annular surface of the housing;
   wherein:
   the first annular surface of the housing is in sliding contact with the first annular surface of the first electrically non-conductive annular spacer;
   the second annular surface of the first electrically non-conductive annular spacer is in sliding contact with the first annular surface of the outwardly-extending flange;
   the second annular surface of the outwardly-extending flange is in sliding contact with the first annular surface of the second electrically non-conductive annular spacer; and
   the second annular surface of the second electrically non-conductive annular spacer is in sliding contact with the second annular surface of the housing; and
   wherein the first and second annular surfaces of the housing apply a compressive load to the outwardly-extending flange by means of the first and second electrically non-conductive annular spacers to provide a seal between the annular surfaces that are in sliding contact, and differential thermal expansion between the sensor body and the housing is accommodated by the sliding contact between the annular surfaces.

2. The sensor assembly of claim 1, wherein the first and second electrically non-conductive annular spacers are formed from a ceramic material, wherein the housing is formed from one of a metal and a metal alloy, and wherein the sensor body is formed from one or more of a metal, a metal alloy and a ceramic material.

3. The sensor assembly of claim 1, wherein the flange includes an outer edge surface between the first and second annular surfaces.

4. The sensor assembly of claim 1, wherein the annular groove includes an inner surface between the annular surfaces of the housing.

5. The sensor assembly of claim 4, wherein each of the first and second electrically non-conductive annular spacers include an outer edge surface that faces the inner surface of the annular groove and an inner edge surface that faces an outer surface of the support body.

6. The sensor assembly of claim 5, wherein the outer edge surfaces of the first and second electrically non-conductive annular spacers are in contact with the inner surface of the annular groove and the inner edge surfaces of the first and second electrically non-conductive annular spacers are in contact with the outer surface of the sensor body.

7. The sensor assembly of claim 1, wherein the sensor body is spaced apart from the housing by an annular void.

8. The sensor assembly of claim 1, wherein the sensor body is spaced apart from the housing by an electrically non-conductive material.

9. The sensor assembly of claim 1, wherein the sensor body includes an electrically conductive electrode.

10. The sensor assembly of claim 9, wherein the sensor body has a multi-layered construction with a layer of an electrically conductive material that defines the electrode and one or more layers of an electrically non-conductive material.

11. The sensor assembly of claim 9, wherein the housing includes an end part that includes a recessed opening in which the electrode or sensor body is located.

12. The sensor assembly of claim 11, wherein the end part of the housing is spaced apart from the electrode or the sensor body by an annular void.

13. The sensor assembly of claim 11, wherein the end part of the housing is spaced apart from the electrode or the sensor body by an electrically non-conductive material.

14. The sensor assembly of claim 13, wherein the electrode or the sensor body includes a surface, and wherein the electrically non-conductive material is a thermal barrier coating that also extends on the surface of the electrode or the sensor body.

15. The sensor assembly of claim 1, wherein the housing is a two-part housing, and wherein the first annular surface of the annular groove is formed in a first housing part and the second annular surface of the annular groove is formed in a second housing part.

16. The sensor assembly of claim 15, wherein the first housing part is fixedly secured to the second housing part and the sensor body is not physically secured to the two-part housing.

17. The sensor assembly of claim 1, wherein the first and second annular surfaces of the housing apply a compressive load to the outwardly-extending flange by means of the first and second electrically non-conductive annular spacers to provide a hermetic seal between the annular surfaces that are in sliding contact.

18. A method of manufacturing a sensor assembly comprising the steps of:
providing a sensor body having an outwardly-extending flange with a first annular surface and a second annular surface;
providing a first electrically non-conductive annular spacer having a first annular surface, a second annular surface, and an opening;
receiving the sensor body through the opening in the first electrically non-conductive annular spacer and bringing the second annular surface of the first electrically non-conductive annular spacer into contact with the first annular surface of the outwardly-extending flange;
providing a second electrically non-conductive annular spacer having a first annular surface, a second annular surface, and an opening;
receiving the sensor body through the opening in the second electrically non-conductive annular spacer and bringing the second annular surface of the outwardly-extending flange into contact with the first annular surface of the second electrically non-conductive annular spacer;
locating the sensor body and the first and second electrically non-conductive annular spacers in a two-part housing having an annular groove in which the outwardly-extending flange and the first and second electrically non-conductive annular spacers are received, the annular groove being defined between a first annular surface formed in a first housing part and a second annular surface formed in a second housing part;
bringing the first annular surface of the first housing part into contact with the first annular surface of the first electrically non-conductive annular spacer;
bringing the second annular surface of the second electrically non-conductive annular spacer into contact with the second annular surface of the second housing part; and
securing the first and second housing parts to form an integral two-part housing such that a compressive load is applied to the outwardly-extending flange by means of the first and second electrically non-conductive annular spacers to provide a seal between the annular surfaces that are in sliding contact, and differential thermal expansion between the sensor body and the housing is accommodated by the sliding contact between the annular surfaces.

19. The method of claim 18, wherein the step of securing the first and second housing parts further comprises the steps of:
increasing the temperature of the sensor assembly to a particular temperature during which the first and second housing parts undergo thermal expansion;
securing the first and second housing parts together using a brazing process with the sensor assembly at the particular temperature; and
decreasing the temperature of the sensor assembly during which the first and second housing parts of the integral two-part housing undergo thermal contraction to apply a compressive load to the outwardly-extending flange by means of the first and second electrically non-conductive annular spacers.

20. The method of claim 18, wherein the step of securing the first and second housing parts further comprises the steps of:
mechanically compressing the first and second housing parts together to apply a compressive load to the outwardly-extending flange by means of the first and second electrically non-conductive annular spacers; and
securing the first and second housing parts together by welding while the compressive load is applied.

21. The method of claim 18, wherein the securing the first and second housing parts to form an integral two-part housing such that a compressive load is applied to the outwardly-extending flange by means of the first and second electrically non-conductive annular spacers, provides a hermetic seal between the annular surfaces that are in sliding contact.

* * * * *